US008685146B2

(12) United States Patent
Zhou et al.

(10) Patent No.: US 8,685,146 B2
(45) Date of Patent: Apr. 1, 2014

(54) PROCESSES AND APPARATUSES FOR PREPARING LIQUIFIED NATURAL GAS

(75) Inventors: Lubo Zhou, Inverness, IL (US); Shain-Jer Doong, Kildeer, IL (US); Bradley P. Russell, Wheaton, IL (US); Henry Rastelli, Gurnee, IL (US)

(73) Assignee: UOP LLC, Des Plaines, IL (US)

( * ) Notice: Subject to any disclaimer, the term of this patent is extended or adjusted under 35 U.S.C. 154(b) by 169 days.

(21) Appl. No.: 13/461,046

(22) Filed: May 1, 2012

(65) Prior Publication Data
US 2013/0291723 A1 Nov. 7, 2013

(51) Int. Cl.
B01D 53/04 (2006.01)
B01D 53/14 (2006.01)
B01D 53/26 (2006.01)

(52) U.S. Cl.
CPC .............. *B01D 53/04* (2013.01); *B01D 53/261* (2013.01); *B01D 2256/24* (2013.01); *B01D 53/14* (2013.01)
USPC ....... 95/92; 95/117; 95/143; 95/144; 585/822

(58) Field of Classification Search
CPC ...................................... B01D 53/04
USPC ................ 96/132; 95/92, 117, 143, 144, 147; 62/611; 585/820, 822; 423/220, 228
See application file for complete search history.

(56) References Cited

U.S. PATENT DOCUMENTS

| 5,746,788 | A | * | 5/1998 | Schmidt et al. .............. 48/198.2 |
| 6,479,022 | B1 | | 11/2002 | Campbell et al. |
| 6,610,124 | B1 | | 8/2003 | Dolan et al. |
| 6,682,711 | B2 | | 1/2004 | Motal et al. |
| 7,442,233 | B2 | | 10/2008 | Mitariten |
| 7,799,117 | B1 | * | 9/2010 | Li et al. .............................. 95/96 |
| 8,268,047 | B2 | * | 9/2012 | Allie ................................. 95/117 |
| 2009/0118528 | A1 | | 5/2009 | Yang et al. |
| 2010/0011663 | A1 | | 1/2010 | Coyle |
| 2010/0083696 | A1 | | 4/2010 | Hoang-Dinh et al. |
| 2011/0290110 | A1 | | 12/2011 | Zhou et al. |

OTHER PUBLICATIONS

Daiminger, U., et al., "Adsorption added value," Hydrocarbon Engineering, Vol. 11, No. 2, p. 83-84, 86, Feb. 2006; ISSN: 14689340; Publisher: Palladian Publications.
DiNapoli, R.N., "Pick LNG Pre-Treat With Care," Hydrocarbon Process, vol. 49, No. 12, p. 93-96, Dec. 1970; ISSN: 00188190; Publisher: Gulf Publishing Co.
Knaebel, K.S., "Adsorbent Selection," Adsorption Research Inc., http//www.adsorption.com/publications, AdsorbentSel1B.pdf, Jun. 2004 (24 pages).

* cited by examiner

*Primary Examiner* — Frank Lawrence, Jr.
(74) *Attorney, Agent, or Firm* — Mark Goldberg

(57) ABSTRACT

Processes and apparatuses are provided for preparing liquified natural gas from a natural gas feed that comprises C5 to C7 hydrocarbons and C8 or greater hydrocarbons. An exemplary process includes effecting the preferential adsorption of the C8 or greater hydrocarbons from the natural gas feed over adsorption of hydrocarbons having less than 8 carbon atoms to provide a C8-depleted natural gas stream. The process continues with effecting the preferential adsorption of the C5 to C7 hydrocarbons from the C8-depleted natural gas stream over adsorption of hydrocarbons having less than 5 carbon atoms to form a C5 to C8-depleted natural gas stream. The C5 to C7 hydrocarbons are preferentially adsorbed with higher selectivity and capacity than adsorption of the C5 to C7 hydrocarbons during preferentially adsorbing the C8 or greater hydrocarbons. The C5 to C8-depleted natural gas stream is then liquified.

19 Claims, 4 Drawing Sheets

PROCESSES AND APPARATUSES FOR PREPARING LIQUIFIED NATURAL GAS

TECHNICAL FIELD

The present invention generally relates to processes for preparing liquified natural gas from a natural gas feed that comprises C5 to C7 hydrocarbons and C8 or greater hydrocarbons. More particularly, the present invention relates to processes for adsorbing C8 or greater hydrocarbons and C5 to C7 hydrocarbons, such as neopentane, from natural gas feed prior to liquifying the natural gas feed.

BACKGROUND

Natural gas, which primarily includes methane, has grown into a viable alternative energy source to petroleum over recent years, especially in the United States, due to drastic increases in proven worldwide and domestic reserves and due to a desire for increased energy independence. Many proven natural gas reserves, however, are characterized as sub-quality due to the presence of compounds other than methane therein. While high-quality natural gas reserves may require less processing for commercialization, the sub-quality natural gas reserves are generally significantly cheaper sources of natural gas. In addition, the sub-quality natural gas reserves provide cost-savings opportunities as more efficient processing techniques are developed to process the natural gas from the reserves for commercialization.

One processing consideration for commercializing natural gas involves liquifying the natural gas, which provides ease of storage and transport and which can decrease a volume of the natural gas by up to 600 times. High-quality natural gas reserves may be liquified with relative ease. However, difficulties with liquifying natural gas from sub-quality natural gas reserves persist due to the presence of compounds other than methane. In particular, compounds that freeze at higher temperatures than a boiling point of methane may be present in the sub-quality natural gas reserves and may freeze during liquefaction of the natural gas, thereby causing plugging and blockage in pipes during liquefaction. Examples of compounds that may be present in the natural gas and that may freeze during liquefaction include benzene, toluene, xylene, cyclohexane, and neopentane. Neopentane is particularly problematic due to its high freezing point of about −17° C., which will generally result in freezing during liquefaction of the natural gas, and due to its lower molecular weight and unique spherical molecular structure compared to benzene, toluene, and xylene, which makes neopentane more difficult to separate from the natural gas than benzene, toluene, and xylene.

Adsorption methods have been developed for selectively removing compounds from natural gas in preparation for liquefaction. Adsorption generally involves collection of molecules on a surface of an adsorbent. For example, silica gels, aluminosilicate gels, zeolite molecular sieves, and activated carbon are known adsorbents for adsorbing various compounds from natural gas. Due to relative ease of regeneration as compared to other adsorbents, silica gels and aluminosilicate gels have gained widespread use for depleting natural gas of various hydrocarbons such as benzene, toluene, xylene, and other hydrocarbons having greater than 8 carbon atoms. However, to deplete the natural gas of certain hydrocarbons such as C5 to C7 hydrocarbons including heptanes, cyclohexanes, benzene, and neopentane to desirable concentrations, adsorbent beds including the silica gels and aluminosilicate gels are generally required to have a higher volume than would otherwise be required to deplete the natural gas of C8 or greater hydrocarbons alone.

Despite the benefits associated with adsorbing compounds from natural gas using silica gels and aluminosilicate gels, it is desirable to maximize efficiency of C8 or greater hydrocarbon adsorption, in addition to maximizing efficiency of C5 to C7 hydrocarbon adsorption, especially neopentane, cyclohexane, benzene, and heptane adsorption, from natural gas to minimize a concentration of the aforementioned hydrocarbons in the natural gas feed into permissible ranges for liquefaction. It is also desirable to minimize adsorbent bed volume while avoiding excessive regeneration requirements for adsorbents that are employed in the adsorbent beds.

BRIEF SUMMARY

Processes and apparatuses are provided for preparing liquified natural gas from a natural gas feed that comprises C5 to C7 hydrocarbons and C8 or greater hydrocarbons. In an embodiment, a process for preparing liquified natural gas from natural gas feed that comprises C5 to C7 hydrocarbons and C8 or greater hydrocarbons includes effecting the preferential adsorption of the C8 or greater hydrocarbons from the natural gas feed over adsorption of hydrocarbons having less than 8 carbon atoms to provide a C8-depleted natural gas stream. The process continues with effecting the preferential adsorption of the C5 to C7 hydrocarbons from the C8-depleted natural gas stream over adsorption of hydrocarbons having less than 5 carbon atoms to form a C5 to C8-depleted natural gas stream. The C5 to C7 hydrocarbons are preferentially adsorbed with higher selectivity and capacity than adsorption of the C5 to C7 hydrocarbons during preferentially adsorbing the C8 or greater hydrocarbons. The C5 to C8-depleted natural gas stream is then liquified.

Another embodiment of a process for preparing liquified natural gas from natural gas feed that comprises C5 to C7 hydrocarbons and C8 or greater hydrocarbons includes contacting a first adsorbent that preferentially adsorbs the C8 or greater hydrocarbons with the natural gas feed to provide a C8-depleted natural gas stream. The process continues with contacting a second adsorbent that is different than the first adsorbent and that preferentially adsorbs the C5 to C7 hydrocarbons with the C8-depleted natural gas stream to provide a C5 to C8-depleted natural gas stream. The second adsorbent has higher selectivity and capacity for adsorbing the C5 to C7 hydrocarbons than the first adsorbent. A third adsorbent that preferentially adsorbs residual water is also contacted with the C8-depleted natural gas stream. The C5 to C8-depleted natural gas stream is then liquified in a liquifying stage.

An embodiment of an apparatus for preparing liquified natural gas from a natural gas feed includes a first adsorbent bed that comprises a first adsorbent. The first adsorbent preferentially adsorbs C8 or greater hydrocarbons over hydrocarbons having less than 8 carbon atoms. The apparatus also includes a second adsorbent bed that is downstream of the first adsorbent bed. The second adsorbent bed comprises a second adsorbent that is different than the first adsorbent and that preferentially adsorbs C5 to C7 hydrocarbons over hydrocarbons having less than 5 carbon atoms. The second adsorbent has higher selectivity and capacity for adsorbing the C5 to C7 hydrocarbons than the first adsorbent. The apparatus also includes a liquifying stage that is downstream of the second adsorbent bed.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
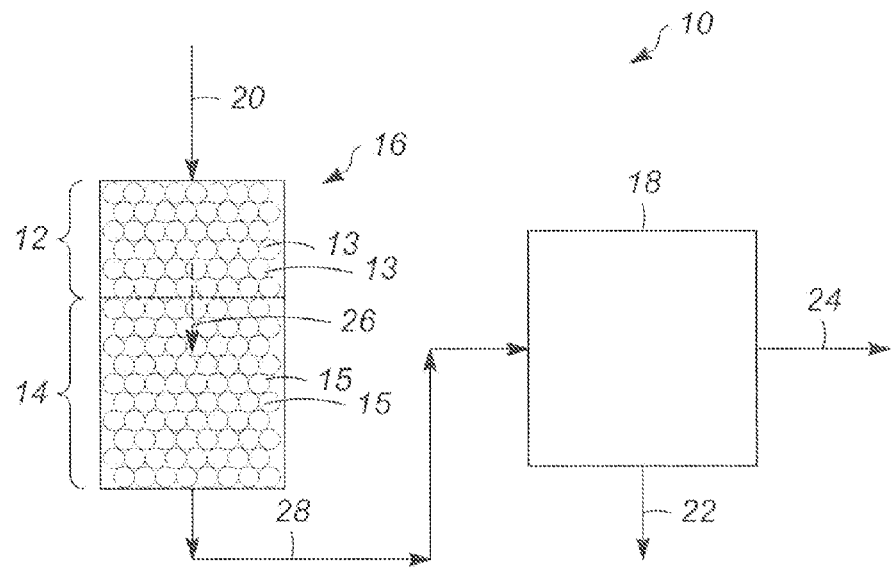
FIG. 1 is a schematic diagram of an apparatus using an exemplary embodiment of a process for preparing liquified natural gas, with the apparatus including a multi-bed adsorption unit.

The following detailed description is merely exemplary in nature and is not intended to limit the invention or the application and uses of the invention. Furthermore, there is no intention to be bound by any theory presented in the preceding background or the following detailed description.

Processes for preparing liquified natural gas from a natural gas feed are provided, as are apparatuses for preparing the liquified natural gas. The processes are applicable for preparing liquified natural gas from natural gas feed that includes C5 to C7 hydrocarbons and C8 or greater hydrocarbons, which hydrocarbons may be present in natural gas reserves. The processes involve first effecting the preferential adsorption of the C8 or greater hydrocarbons from the natural gas feed over hydrocarbons that have less than 8 carbon atoms to provide a C8-depleted natural gas stream. As referred to herein, "preferential adsorption" means that the compounds referred to are adsorbed at greater equilibrium loadings as compared to other compounds, although non-preferential compounds may also be adsorbed in small quantities. Also as referred to herein, "depleted" means that a majority of the compounds referred to are removed from the natural gas feed, and the subject compounds may be reduced to trace concentrations of less than or equal to about 100 parts per million, such as less than or equal to 10 parts per million, by volume based upon the total volume of the natural gas feed after removal of the subject compounds. The process continues with effecting the preferential adsorption of the C5 to C7 hydrocarbons from the C8-depleted natural gas stream over hydrocarbons that have less than 5 carbon atoms to form a C5 to C8-depleted natural gas stream. The C5 to C7 hydrocarbons are preferentially adsorbed to deplete neopentane, cyclohexane, benzene, and heptanes into permissible ranges for liquefaction since those hydrocarbons are particularly prone to freezing during liquefaction, and other C5 and C6 hydrocarbons that are not particularly prone to freezing during liquefaction are incidentally removed along with the neopentane, cyclohexane, benzene, and heptanes. The C5 to C7 hydrocarbons are also preferentially adsorbed with higher selectivity and capacity than adsorption of the C5 to C7 hydrocarbons during preferentially absorbing of the C8 or greater hydrocarbons. As referred to herein, "selectivity" refers to effectiveness of an adsorbent in adsorbing particular compounds from a gas stream and decreasing the concentration of those compounds in the gas stream. As also referred to herein, "capacity" refers to the amount of target hydrocarbons that can be adsorbed by an adsorbent per unit mass of the adsorbent. The processes described herein enable maximized efficiency of the C8 or greater hydrocarbon adsorption, in addition to maximized efficiency of C5 to C7 hydrocarbon adsorption, from natural gas to thereby minimize concentration of the neopentane, cyclohexane, benzene, heptanes, and C8 or greater hydrocarbons in the natural gas feed into permissible ranges for liquefaction. In particular, by first effecting the preferential adsorption of the C8 or greater hydrocarbons, the C5 to C7 hydrocarbons can be preferentially adsorbed using adsorbents that are more selective and have a higher capacity for adsorbing the C5 to C7 hydrocarbons than adsorbents that are used to preferentially adsorb the C8 or greater hydrocarbons, but that would otherwise require excessive regeneration if exposed to high concentrations of the C8 or greater hydrocarbons. Because the C8 or greater hydrocarbons are preferentially adsorbed to provide the C8-depleted natural gas stream prior to effecting the preferential adsorption of the C5 to C7 hydrocarbons from the C8-depleted natural gas stream, excessive regeneration of the adsorbent used to effect the preferential adsorption of the C5 to C7 hydrocarbons is not a concern, thereby enabling the adsorbents that are more selective and have a higher capacity for adsorbing the C5 to C7 hydrocarbons to be used. As a result, overall adsorbent bed volumes may be minimized while still depleting the C8 or greater hydrocarbons and neopentane, cyclohexane, benzene, and heptanes to concentrations in the natural gas feed into permissible ranges for liquefaction.

C5 to C7 hydrocarbons that may be present in the natural gas feed include, but are not limited to, various forms of pentane including i-pentane, n-pentane, and neopentane; various forms of hexane such as n-hexane and cyclohexane; benzene; n-heptane; toluene; and combinations thereof. Examples of C8 or greater hydrocarbons that may be present in the natural gas feed include, but are not limited to, n-octane; various forms of xylene such as o-xylene; n-nonane; n-decane; and combinations thereof. In one specific embodiment, neopentane is present in the natural gas feed. In particular, neopentane, cyclohexane, benzene, heptanes, and C8 or greater hydrocarbons may be present in the natural gas feed in concentrations that would be problematic when liquifying the natural gas feed due to freezing of the aforementioned hydrocarbons. For example, the aforementioned hydrocarbons can be present in amounts in excess of 100 parts per million by volume (ppmv), such as from about 100 to about 1000 ppmv, which amounts pose difficulties if not depleted to 100 ppmv or less. As one specific example, neopentane may be present in the natural gas feed in an amount of from about 10 to about 200 ppmv, such as from about 50 to about 150 ppmv, which amounts pose difficulties during liquefaction of the natural gas feed if not depleted to 2 ppmv or less. The natural gas feed also includes methane, which is present in amounts of greater than 50 percent by volume, such as from about 80 to about 99.8 percent by volume, or from about 95 to about 99.5 percent by volume, or from about 99.0 to about 99.5 percent by volume, based on the total volume of the natural gas feed.

An exemplary embodiment of a process for preparing liquified natural gas from a natural gas feed that includes C5 to C7 hydrocarbons and C8 or greater hydrocarbons will now be addressed with reference to an exemplary apparatus 10 for preparing liquified natural gas 24 as shown in FIG. 1. Referring to FIG. 1, the apparatus 10 of this embodiment includes a first adsorbent bed 12 and a second adsorbent bed 14 that is downstream of the first adsorbent bed 12. The first adsorbent bed 12 includes a first adsorbent 13, and the second adsorbent bed 14 includes a second adsorbent 15. As shown in FIG. 1, the first adsorbent bed 12 and the second adsorbent bed 14 are provided in a multi-bed adsorption unit 16. However, although not shown, it is to be appreciated that the first adsorbent bed and the second adsorbent bed may be provided in independent units.

The process includes effecting the preferential adsorption of the C8 or greater hydrocarbons from the natural gas feed over hydrocarbons having less than 8 carbon atoms to provide a C8-depleted natural gas stream. In accordance with the exemplary process conducted in the apparatus 10 of FIG. 1, the C8 or greater hydrocarbons are preferentially adsorbed from the natural gas feed 20 by contacting the first adsorbent 13, which preferentially adsorbs the C8 or greater hydrocarbons, with the natural gas feed 20 to provide the C8-depleted natural gas stream 26. In this embodiment, to contact the first adsorbent 13 with the natural gas feed 20, the natural gas feed 20 is introduced into the first adsorbent bed 12 of the multi-bed adsorption unit 16 of FIG. 1 to provide the C8-depleted natural gas stream 26.

The first adsorbent 13 preferentially adsorbs the C8 or greater hydrocarbons over adsorption of hydrocarbons having less than 8 carbon atoms. The first adsorbent 13 may also preferentially adsorb water, to the extent that water may be present in the natural gas feed 20. Under some circumstances, as described in further detail below, the natural gas feed 20 may be saturated with water. However, the presence of water in the natural gas feed 20 is optional and, to the extent that water is present, the first adsorbent 13 may preferentially adsorb most of the water from the natural gas feed 20 along with the C8 or greater hydrocarbons.

Exemplary first adsorbents that preferentially adsorb the C8 or greater hydrocarbons over hydrocarbons having less than 8 carbon atoms are known in the art and include silica gels and aluminosilicate gels that have an average pore size (i.e., diameter) of at least 10 Angstroms, such as from about 10 to about 100 Angstroms or from about 10 to about 20 Angstroms. Silica gels are known in the art and generally refer to non-crystalline forms of silica, although silica gels are generally rigid. Silica gels generally comprise an assemblage of spherical microparticles made of colloidal silica. Due to the relatively large average pore size, the silica gels readily adsorb the C8 or greater hydrocarbons and also readily adsorb water (when present in the natural gas feed 20). Also due to the relatively large pore size and the chemical composition of the silica gels and aluminosilicate gels, regeneration of the silica gels and aluminosilicate gels to desorb the C8 or greater hydrocarbons from the surface thereof is less energy-intensive than for other adsorbents having smaller pore size or different chemical composition. Specific examples of suitable silica gel and aluminosilicate gel adsorbents are commercially available under the tradename Sorbead® from BASF Corporation of Florham Park, N.J. In an embodiment, the silica gel or aluminosilicate gel forms at least 80 percent by volume of the first adsorbent bed 12, and may form about 100 percent by volume of the first adsorbent bed 12.

For purposes of the instant application, the C8-depleted natural gas stream is defined as the natural gas stream that is produced after effecting the preferential adsorption of the C8 or greater hydrocarbons from the natural gas feed prior to effecting the preferential adsorption of the C5 to C7 hydrocarbons from the natural gas stream with higher selectivity and capacity than exists during preferential adsorption of the C8 or greater hydrocarbons. In the exemplary process conducted in the apparatus 10 of FIG. 1, the C8-depleted natural gas stream 26 is defined as the natural gas stream that exits the first adsorbent bed 12.

In an embodiment, the C8 or greater hydrocarbons are depleted, through preferential adsorption by the first adsorbent, to a concentration of less than or equal to about 100 ppmv, such as less than or equal to about 10 ppmv, less than or equal to about 1 part per million, or from about 0.1 to about 0.4 ppmv, in the C8-depleted natural gas stream. In particular, the step of effecting the preferential adsorption of the C8 or greater hydrocarbons includes depleting each of the C8 or greater hydrocarbons to the aforementioned concentrations to provide the C8-depleted natural gas stream. As such, in the exemplary process conducted in the apparatus 10 of FIG. 1, the C8-depleted natural gas stream 26 that exits the first adsorbent bed 12 has the aforementioned concentrations of the C8 or greater hydrocarbons before further processing.

The process continues with effecting the preferential adsorption of the C5 to C7 hydrocarbons from the C8-depleted natural gas stream over adsorption of hydrocarbons having less than 5 carbon atoms to form a C5 to C8-depleted natural gas stream. In accordance with the exemplary process conducted in the apparatus 10 of FIG. 1, the C5 to C7 hydrocarbons are preferentially adsorbed from the C8-depleted natural gas stream 26 by contacting the second adsorbent 15, which preferentially adsorbs the C5 to C7 hydrocarbons, with the C8-depleted natural gas stream 26 to provide the C5 to C8-depleted natural gas stream 28. In this embodiment, to contact the second adsorbent 15 with the C8-depleted natural gas stream 26, the C8-depleted natural gas stream 26 is introduced directly into the second adsorbent bed 14 from the first adsorbent bed 12 of the multi-bed adsorption unit 16 of FIG. 1 to provide the C5 to C8-depleted natural gas stream 28.

The second adsorbent 15 is different from the first adsorbent 13 and that preferentially adsorbs the C5 to C7 hydrocarbons over adsorption of hydrocarbons having less than 5 carbon atoms. The second adsorbent 15 has higher selectivity and capacity for adsorbing the C5 to C7 hydrocarbons than the first adsorbent 13. In particular, the second adsorbent 15 is more effective in adsorbing the C5 to C7 hydrocarbons from the natural gas feed 20 than the first adsorbent 13, thereby enabling low concentrations of the C5 to C7 hydrocarbons in the hydrocarbon feed to be achieved that could only be achieved with higher bed volume of the first adsorbent 13 in the first adsorbent bed 12. In this regard, the C5 to C7 hydrocarbons are preferentially adsorbed with higher selectivity and capacity than adsorption of the C5 to C7 hydrocarbons during preferentially adsorbing the C8 or greater hydrocarbons. While some of the C5 to C7 hydrocarbons may be adsorbed by the first adsorbent 13, and may even be preferentially adsorbed by the first adsorbent 13 over hydrocarbons having less than 5 carbon atoms after depletion of the C8 or greater hydrocarbons by the first adsorbent 13, selectivity and capacity of the second adsorbent 15 for adsorbing the C5 to C7 hydrocarbons is still higher than selectivity and capacity of the first adsorbent 13 for adsorbing the C5 to C7 hydrocarbons.

The second adsorbent 15 is also capable of preferentially adsorbing at least some of the C8 or greater hydrocarbons (such as octane), and may be capable of preferentially adsorbing some of the C8 or greater hydrocarbons with higher selectivity and capacity than the first adsorbent 13. However, because the second adsorbent bed 14 is downstream of the first adsorbent bed 12, the natural gas feed 20 will be depleted of the C8 or greater hydrocarbons upstream of the second adsorbent bed 14, which is desirable because regeneration of the second adsorbent 15 after adsorbing large quantities of the C8 or greater hydrocarbons may require excessive energy expenditures, and in any event would require greater energy expenditure for regeneration than the first adsorbent 13 due to the higher selectivity and capacity for adsorbing the C5 to C7 hydrocarbons.

Exemplary second adsorbents that preferentially adsorb the C5 to C7 hydrocarbons over hydrocarbons having less than 5 carbon atoms are known in the art. In an embodiment, the second adsorbent 15 includes a zeolite molecular sieve adsorbent having an average pore size of from about 5 to about 15 Angstroms. Suitable zeolite molecular sieve adsorbents include calcium-exchanged (CaX) zeolite and sodium-exchanged (NaX) zeolite, which have an average pore size of about 10 Angstroms. In an embodiment, the zeolite molecular sieve adsorbent forms at least 50 percent by volume of the second adsorbent bed 14, and may form 100 percent by volume of the second adsorbent bed 14. Specific examples of suitable NaX zeolites are commercially available under the tradename Molsiv™ from UOP LLC of Des Plaines, Ill. In another embodiment, the second adsorbent 15 includes an activated carbon adsorbent in addition or as an alternative to the zeolite molecular sieve adsorbent. Suitable activated carbon adsorbent may have a pore size of about 20 Angstroms and a surface area of about 1,000 $m^2/g$. When the second adsorbent 15 includes activated carbon adsorbent in addition to the zeolite molecular sieve adsorbent, the activated carbon adsorbent may be disposed downstream of the zeolite molecular sieve adsorbent. In an embodiment, the activated carbon adsorbent forms at least 50 percent by volume of the second adsorbent 15, and may form 100 percent by volume of the second adsorbent bed 14. Due to the smaller pore sizes in the second adsorbent 15 and/or the chemical composition thereof, the second adsorbent 15 has higher selectivity and capacity for adsorbing the C5 to C7 hydrocarbons than the first adsorbent 13.

In an embodiment, the C5 to C7 hydrocarbons, such as neopentane are depleted, through preferential adsorption by the second adsorbent, to a concentration of less than or equal to about 2 ppmv, such as less than or equal to about 1 ppmv or from about 0.1 to about 0.4 ppmv, in the C5 to C8-depleted natural gas stream. In particular, the step of effecting the preferential adsorption of the C5 to C7 hydrocarbons includes depleting each of the C5 to C7 hydrocarbons to the aforementioned concentrations to provide the C5 to C8-depleted natural gas stream. For example, in one specific embodiment, in which the natural gas feed includes neopentane, the neopentane and, optionally, other C5 to C7 hydrocarbons are preferentially adsorbed from the C8-depleted natural gas stream. In this embodiment, the neopentane is depleted to a concentration of less than or equal to about 2 ppmv in the C5 to C8-depleted natural gas stream, such as from about 0.1 to about 1 ppmv or from about 0.1 to about 0.4 ppmv. In the exemplary process conducted in the apparatus 10 of FIG. 1, the C5 to C8-depleted natural gas stream 28 that exits the second adsorbent bed 14 has the aforementioned concentrations of the C5 to C7 hydrocarbons before further processing.

Although FIG. 1 illustrates the first adsorbent 13 and the second adsorbent 15 as being in pellet or bead form, the first adsorbent 13 and the second adsorbent 15 may be employed in any physical form that is known in the art, such as extrudates, honeycombs, or in composites supported on substrates. The first adsorbent 13 may be provided in an amount of from about 10 to about 90 percent by volume, such as from about 30 to about 70 percent by volume or from about 40 to about 60 percent by volume, based upon a combined volume of the first adsorbent 13 and the second adsorbent 15. The second adsorbent 15 may be provided in an amount of from about 10 to about 90 percent by volume, such as from about 30 to about 70 percent by volume or from about 40 to about 60 percent by volume, based upon the combined volume of the first adsorbent 13 and the second adsorbent 15. Relative volumes of the first adsorbent 13 and/or the second adsorbent 15 outside of the aforementioned ranges may result in insufficient adsorption of the C5 to C7 hydrocarbons and/or the C8 or greater hydrocarbons such that liquefaction may be impacted by excessively high concentrations of the neopentane, cyclohexane, benzene, heptanes, and/or the C8 or greater hydrocarbons. In the embodiment shown in FIG. 1, the first adsorbent 13 and the second adsorbent 15, together, form 100 percent by volume of all adsorbent that is employed in the multi-bed adsorption unit 16. However, it is to be appreciated that in other embodiments, additional adsorbent beds may be included that include additional adsorbents. In such embodiments, the combined amount of the first adsorbent 13 and the second adsorbent 15 may be at least 70 percent by volume, based upon the total volume of all adsorbent that are employed for adsorption in the multi-bed adsorption unit.

The process continues with liquifying the C5 to C8-depleted natural gas stream. The step of liquifying the C5 to C8-depleted natural gas stream encompasses various sub-steps that may be conducted to further remove various other compounds and to liquify the resulting natural gas stream. Liquifying natural gas generally involves condensing the natural gas into a liquid, generally by cooling the natural gas at appropriate temperatures and pressures. In accordance with the exemplary process that is conducted in the apparatus 10 of FIG. 1, the apparatus 10 includes a liquifying stage 18 that is downstream of the second adsorbent bed 14. The liquifying stage 18 may include conventional equipment for cooling the C5 to C8-depleted natural gas stream, and may also include equipment for separating various components from a natural gas feed 20 as the C5 to C8-depleted natural gas stream 28 is cooled to sufficiently low temperatures for liquefaction. The C5 to C8-depleted natural gas stream 28 is liquified in the liquifying stage 18, which produces a liquified natural gas 24 stream. In this embodiment, natural gas liquids (NGL) and liquified petroleum gas (LPG), shown as a single NGL/LPG stream 22 in FIG. 1, are also provided by the liquifying stage 18 and represent fractions that are separated from the C5 to C8-depleted natural gas stream 28 as the C5 to C8-depleted natural gas stream 28 is cooled to sufficiently low temperatures for liquefaction. The liquifying stage 18 may also include conventional equipment for separating additional undesirable components of the natural gas feed 20 such as, for example, mercury, nitrogen-containing species, and the like.

Figure 2:
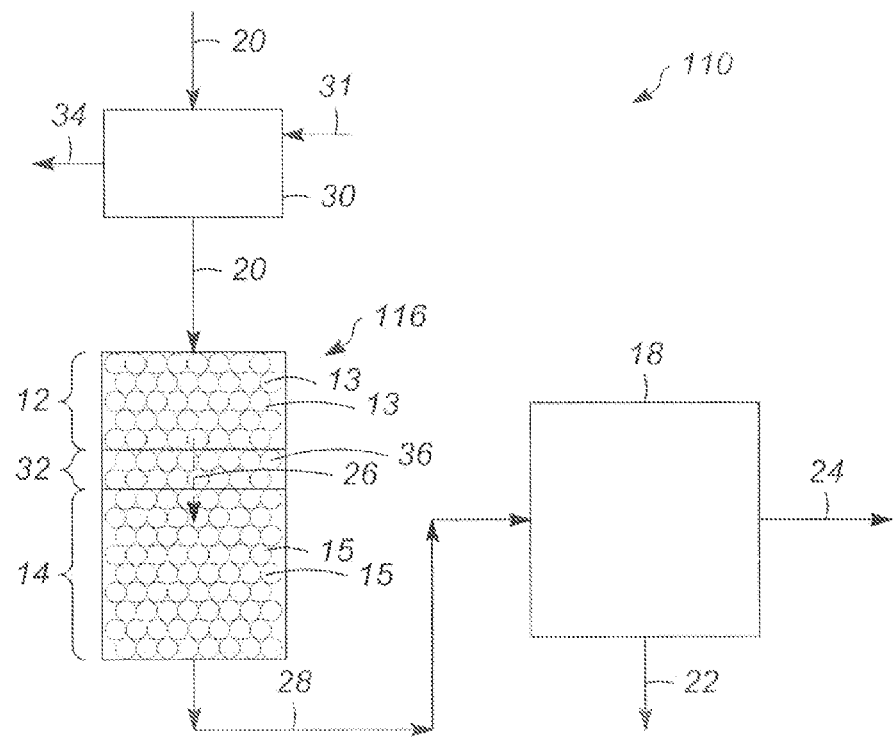
FIG. 2 is a schematic diagram of another embodiment of an apparatus using another exemplary embodiment of a process for preparing liquified natural gas, with the apparatus including another embodiment of a multi-bed adsorption unit.

Another exemplary embodiment of a process for preparing liquified natural gas from a natural gas feed that includes C5 to C7 hydrocarbons and C8 or greater hydrocarbons will now be addressed with reference to an exemplary apparatus 110 for preparing liquified natural gas 24 as shown in FIG. 2. In accordance with this embodiment, it is illustrated that the natural gas feed 20 may be subject to other processing prior to adsorption of the C8 or greater hydrocarbons, and that other preferential adsorption steps may be effected in addition to effecting the preferential adsorption of the C8 or greater hydrocarbons and effecting the preferential adsorption of the C5 to C7 hydrocarbons. In particular, in this embodiment, the process includes the step of removing acid gas, such as carbon dioxide and hydrogen sulfide, from the natural gas feed prior to effecting the preferential adsorption of the C8 or greater hydrocarbons from the natural gas feed. Acid gas may be removed from the natural gas feed by contacting the natural gas feed 20 with an aqueous amine solution 31 in an amine process unit 30, which is generally shown in FIG. 2. Amine process units are known in the art. In the amine process unit 30, acid gas reacts with the aqueous amine solution 31 to form weak chemical bonds with the aqueous amine solution 31 at high pressure, while the other components of the natural gas feed 20 remain in gaseous form. The aqueous amine solution 31, which carries with it the acid gases, is then remediated to separate an acid gas stream 34 therefrom, while the remaining natural gas feed 20 is further processes as described below. However, the natural gas feed 20 generally becomes saturated with water as a result of contacting the natural gas feed 20 with the aqueous amine solution 31.

The process continues with effecting the preferential adsorption of the C8 or greater hydrocarbons from the natural gas feed 20 over hydrocarbons having less than 8 carbon atoms to provide a C8-depleted natural gas stream. In accordance with the exemplary process conducted in the apparatus 110 of FIG. 2, the natural gas feed 20 is passed from the amine process unit 30 to a first adsorbent bed 12 of a three-bed adsorption unit 116. The first adsorbent bed 12 and the second adsorbent bed 14 of the three-bed adsorption unit 116 are the same as described above in the context of the apparatus 10 shown in FIG. 1. However, in addition to the first adsorbent bed 12 and the second adsorbent bed 14, the three-bed adsorption unit 116 of this embodiment includes a third adsorbent bed 32 that is disposed between the first adsorbent bed 12 and the second adsorbent bed 14. The third adsorbent bed 32 includes a third adsorbent 36 that is different from the first adsorbent 13 and the second adsorbent 15 and that preferentially adsorbs water. The third adsorbent 36 may preferentially adsorb water while not adsorbing C3 or greater hydrocarbons, and the third adsorbent 36 has higher selectivity and capacity for adsorbing water than the first adsorbent 13. In particular, the third adsorbent 36 is more effective in adsorbing water from the natural gas feed 20 than the first adsorbent 13, thereby enabling low concentrations of water in the natural gas feed 20 to be achieved that could only be achieved with higher bed volume of the first adsorbent 13. Exemplary third adsorbents that preferentially adsorb water, without adsorbing C3 or greater hydrocarbons, are known in the art. In an embodiment, the third adsorbent includes a zeolite molecular sieve adsorbent having an average pore size of less than or equal to about 4 Angstroms. Suitable zeolite molecular sieve adsorbents include 4A zeolites, which have an average pore size of about 4 Angstroms. In an embodiment, the zeolite molecular sieve adsorbent forms at least 50 percent by volume of the third adsorbent bed 32, and may form 100 percent by volume of the third adsorbent bed 32. The first adsorbent 13 may be provided in an amount of from about 10 to about 70 percent by volume, the second adsorbent 15 may be provided in an amount of from about 20 to about 90 percent by volume, and the third adsorbent 36 may be provided in an amount of from about 5 to about 20 percent by volume, based upon the combined volume of the first adsorbent 13, the second adsorbent 15, and the third adsorbent 36 in the three-bed adsorption unit 116.

In accordance with the exemplary process conducted in the apparatus 110 of FIG. 2, the process includes effecting the preferential adsorption of residual water from the C8-depleted natural gas stream 26. In this embodiment, the residual water is preferentially adsorbed by contacting the third adsorbent bed 32 with the C8-depleted natural gas stream 26. As shown in FIG. 2, the third adsorbent bed 32 is disposed directly downstream of the first adsorbent bed 12 such that the residual water is preferentially adsorbed directly after effecting the preferential adsorption of the C8 or greater hydrocarbons from the natural gas feed 20. However, it is to be appreciated that other intervening adsorbent beds (not shown) may be present between the first adsorbent bed 12 and the third adsorbent bed 32 in other embodiments. Because the third adsorbent bed 32 is downstream of the first adsorbent bed 12, and because the first adsorbent bed 12 preferentially adsorbs water itself, the natural gas feed 20 will be depleted of most water upstream of the third adsorbent bed 32, with only residual water remaining in the C8-depleted natural gas stream 26. Placing the first adsorbent bed 12, as described, upstream of the third adsorbent bed 32 is desirable because volume of the third adsorbent bed 32 can be minimized while still achieving low concentrations of water in the C5 to C8-depleted natural gas stream 28 that would be difficult to achieve with the first adsorbent bed 12 alone.

The process continues with introducing the C8-depleted natural gas stream 26 from the third adsorbent bed 32 to the second adsorbent bed 14, where preferential adsorption of the C5 to C7 hydrocarbons occurs as described in detail above in the context of the exemplary process that is conducted in the apparatus 10 of FIG. 1. As shown in FIG. 2, the second adsorbent bed 14 is disposed directly downstream of the third adsorbent bed 32 such that the C5 to C7 hydrocarbons are preferentially adsorbed directly after effecting the preferential adsorption of the residual water from the C8-depleted natural gas stream 26. However, it is to be appreciated that other intervening adsorbent beds may be present between the third adsorbent bed 32 and the second adsorbent bed 14 in other embodiments. After the C5 to C8-depleted natural gas stream 28 is provided from the second adsorbent bed 14, the process continues with liquifying the C5 to C8-depleted natural gas stream 28. In accordance with the exemplary process that is conducted in the apparatus 10 of FIG. 2, the C5 to C8-depleted natural gas stream 28 is liquified in the liquifying stage 18, which produces a liquified natural gas 24 stream, in the same manner as described above in the context of the process conducted in the apparatus 10 of FIG. 1.

EXAMPLES

An Aspen Adsim™ model was constructed to evaluate adsorption of C8 or greater hydrocarbons, C5 to C7 hydrocarbons, and neopentane specifically when a multi-bed adsorption unit including a first adsorbent bed and a second adsorbent bed at different relative volumes and different unit heights were employed. The first adsorbent bed included Sorbead-H® adsorbent and the second adsorbent bed included calcium-exchanged zeolite adsorbent (hereinafter referred to as the Molsiv™ adsorbent). Table 1 provides the amounts of various components that were present in the natural gas feed that was employed for purposes of the simulation, along with the exemplary product limits above which freezing during liquefaction is a concern.

TABLE 1

| Component | Units | Product Limit | Lumped Feed for Adsim |
|---|---|---|---|
| Methane | mol % | — | 99.40 |
| Propane | mol % | — | 0.28 |
| n-Butane | ppmv | — | 647.0 |
| n-Pentane | ppmv | — | 468.0 |
| Neopentane | ppmv | 0.4 | 100.0 |
| n-Hexane | ppmv | 2.0 | 856.0 |
| n-Heptane | ppmv | 1.0 | 448.0 |
| n-Octane | ppmv | 0.4 | 219.0 |
| Water | ppmv | 1.0 | 840.0 |

Figure 3:
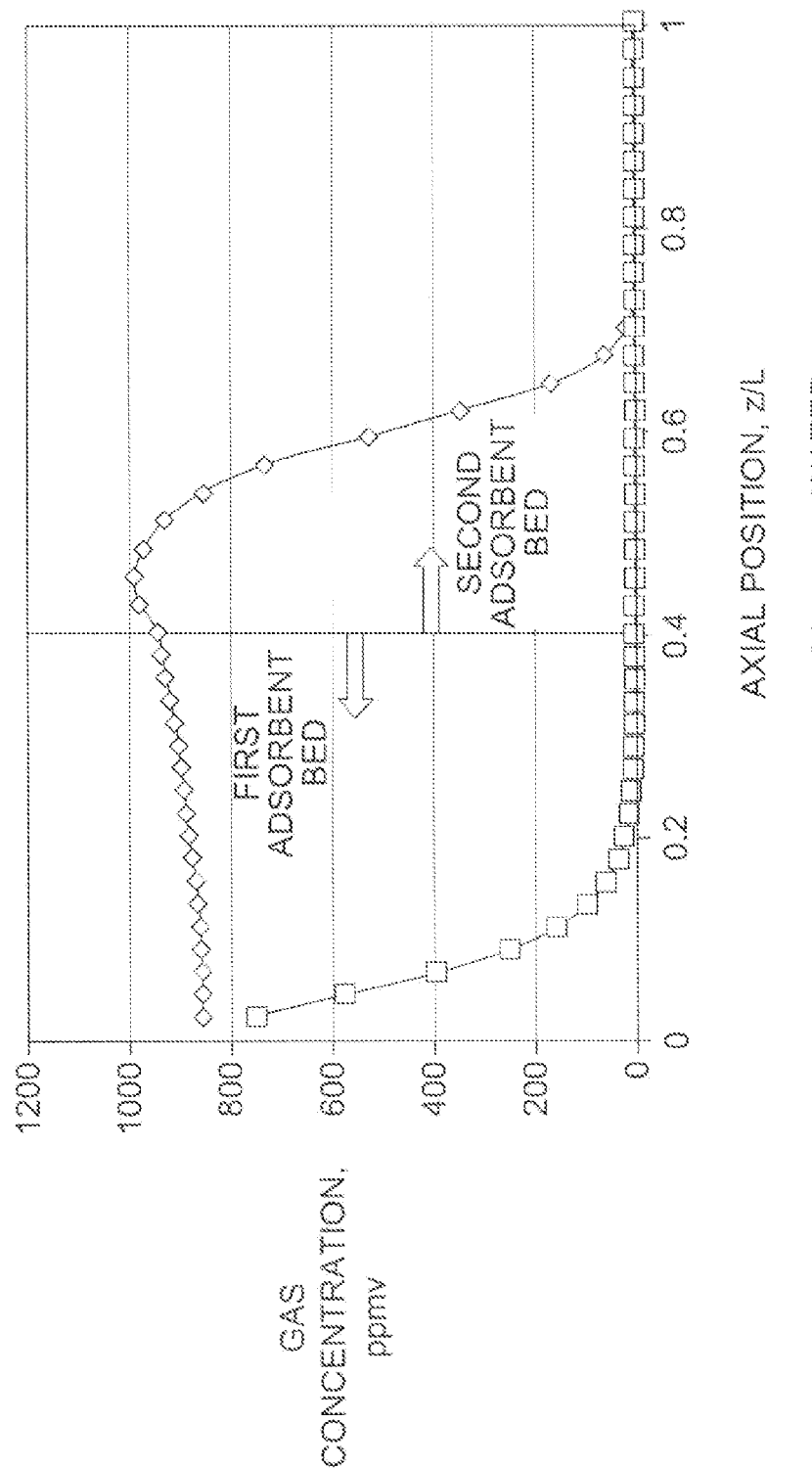
FIG. 3 is a graph showing bed concentration for C6 hydrocarbons and water as a function of axial length along the multi-bed adsorption unit as shown in FIG. 1 as determined through an Aspen Adsim™ simulation.
Figure 4:
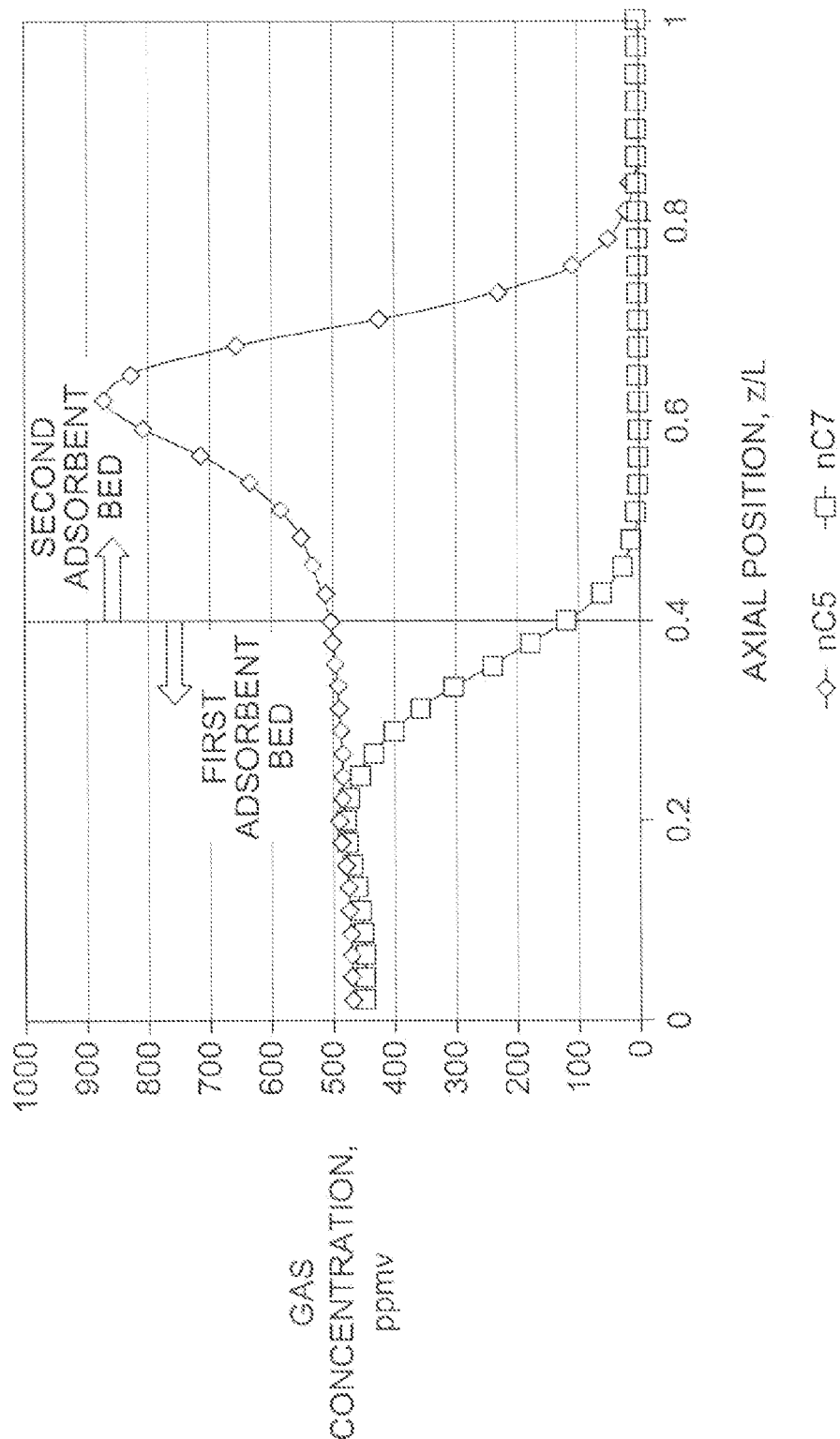
FIG. 4 is a graph showing bed concentration for C5 hydrocarbons and C7 hydrocarbons as a function of axial length along the multi-bed adsorption unit as shown in FIG. 1 as determined through an Aspen Adsim™ simulation.
Figure 5:
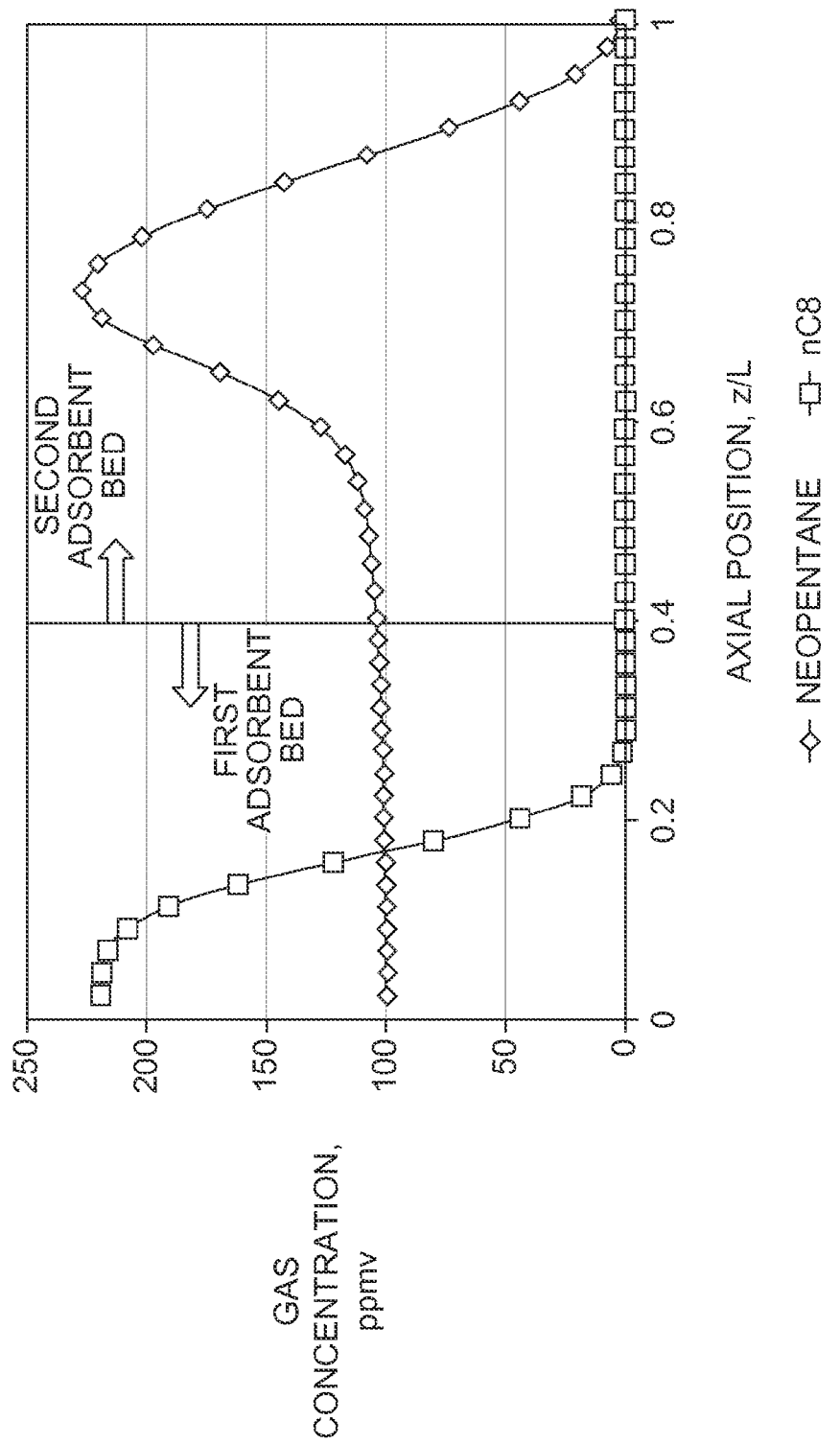
FIG. 5 is a graph showing neopentane and C8 hydrocarbons as a function of axial length along the multi-bed adsorption unit as shown in FIG. 1 as determined through an Aspen Adsim™ simulation

Equilibrium adsorption isotherms, representative of adsorbent selectivity, for Sorbead-H® adsorbent were obtained from an existing proprietary database. Propane isotherms on the Molsiv™ adsorbent from existing proprietary data were used to construct a Polanyi potential theory plot and estimate isotherms for other hydrocarbons. All simulations were conducted with an adsorption unit diameter of 3.35 m using a thermal swing adsorption (TSA) cycle and a regeneration temperature of 288° C. with the first adsorbent bed upstream of the second adsorbent bed (as shown schematically in FIG. 1). Several cases were run with different adsorbent unit heights and different volume splits between the first adsorbent bed and the second adsorbent bed. In all cases there was no breakthrough of C6+ components (i.e., <<0.1 ppmv), and breakthrough of nC5 was much lower than neopentane. As such, neopentane is the controlling impurity. Bed concentration profiles are provided in FIGS. 3-5 for an adsorbent bed having a height of about 2.74 m and volume splits of about 40 percent by volume for the first adsorbent bed and about 60 percent by volume for the second adsorbent bed. More specifically, FIG. 3 shows bed concentration for the C6 hydrocarbons and water, FIG. 4 shows bed concentration for the C5 hydrocarbons and the C7 hydrocarbons, and FIG. 5 shows bed concentration for the neopentane and the C8 hydrocarbons.

Neopentane maximum and average breakthrough is listed in Table 2 for different adsorbent unit heights and different volume splits between the first adsorbent bed and the second adsorbent bed. As can be seen from the results in Table 2, including the second adsorbent bed, in addition to the first adsorbent bed, enables unit height to be reduced while achieving improved performance in terms of reducing maximum and average neopentane breakthrough in the product stream that exits the adsorption unit. Such results illustrate increased efficiency of neopentane adsorption by including the first adsorbent bed and the second adsorbent bed, and also illustrate that adsorbent bed volume can be decreased while achieving the increased efficiency of neopentane adsorption.

TABLE 2

| First Adsorbent Bed, percent by volume | Second Adsorbent Bed, percent by volume | Unit Height, m | Product Neopentane, ppmv Max | Product Neopentane, ppmv Average |
|---|---|---|---|---|
| 100 | 0 | 3.35 | 90.0 | 17.0 |
| 100 | 0 | 3.96 | 45.0 | 6.0 |
| 100 | 0 | 5.18 | 1.5 | 0.2 |
| 80 | 20 | 3.35 | 11.0 | 1.2 |
| 70 | 30 | 3.35 | 1.4 | 0.2 |
| 60 | 40 | 3.35 | 0.1 | <0.1 |
| 70 | 30 | 3.05 | 10.1 | 1.0 |
| 60 | 40 | 3.05 | 1.8 | 0.2 |
| 50 | 50 | 3.05 | 0.6 | <0.1 |
| 60 | 40 | 2.74 | 19.5 | 1.4 |
| 50 | 50 | 2.74 | 9.9 | 0.8 |
| 40 | 60 | 2.74 | 1.8 | <0.1 |
| 50 | 50 | 2.44 | 82.7 | 6.8 |
| 40 | 60 | 2.44 | 67.0 | 4.6 |
| 30 | 70 | 2.44 | 67.0 | 4.2 |
| 20 | 80 | 2.44 | 82.0 | 4.7 |

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A process for preparing liquified natural gas from a natural gas feed that comprises C5 to C7 hydrocarbons and C8 or greater hydrocarbons, said process comprising the steps of:
   effecting the preferential adsorption of the C8 or greater hydrocarbons from the natural gas feed over adsorption of hydrocarbons having less than 8 carbon atoms to provide a C8-depleted natural gas stream;
   effecting the preferential adsorption of the C5 to C7 hydrocarbons from the C8-depleted natural gas stream over adsorption of hydrocarbons having less than 5 carbon atoms to form a C5 to C8-depleted natural gas stream, wherein the C5 to C7 hydrocarbons are preferentially adsorbed with higher selectivity and capacity than adsorption of the C5 to C7 hydrocarbons during preferentially adsorbing the C8 or greater hydrocarbons; and
   liquifying the C5 to C8-depleted natural gas stream.

2. The process of claim 1, wherein the step of effecting the preferential adsorption of the C8 or greater hydrocarbons from the natural gas feed comprises depleting the C8 or greater hydrocarbons from the natural gas feed to a concentration of less than or equal to about 100 parts per million by volume in the C8-depleted natural gas stream.

3. The process of claim 1, wherein the natural gas feed comprises neopentane and wherein the step of effecting the preferential adsorption of the C5 to C7 hydrocarbons is further defined as effecting the preferential adsorption of the neopentane and, optionally, other C5 to C7 hydrocarbons from the C8-depleted natural gas stream.

4. The process of claim 3, wherein the step of effecting the preferential adsorption of neopentane and, optionally, other C5 to C7 hydrocarbons comprises depleting neopentane to a concentration of less than or equal to about 2 parts per million by volume in the C5 to C8-depleted natural gas stream.

5. The process of claim 1, further comprising the step of effecting the preferential adsorption of residual water from the C8-depleted natural gas stream prior to effecting the preferential adsorption of the C5 to C7 hydrocarbons from the C8-depleted natural gas stream.

6. The process of claim 5, further comprising the step of removing acid gas from the natural gas feed prior to effecting the preferential adsorption of the C8 or greater hydrocarbons from the natural gas feed.

7. The process of claim 5, wherein the residual water is preferentially adsorbed from the C8-depleted natural gas stream directly after effecting the preferential adsorption of the C8 or greater hydrocarbons from the natural gas feed, and wherein the C5 to C7 hydrocarbons are preferentially adsorbed from the C8-depleted natural gas stream directly after effecting the preferential adsorption of the residual water from the C8-depleted natural gas stream.

8. A process for preparing liquified natural gas from a natural gas feed that comprises C5 to C7 hydrocarbons and C8 or greater hydrocarbons, said process comprising the steps of:
   contacting a first adsorbent that preferentially adsorbs the C8 or greater hydrocarbons with the natural gas feed to provide a C8-depleted natural gas stream;
   contacting a second adsorbent different than the first adsorbent and that preferentially adsorbs the C5 to C7 hydrocarbons with the C8-depleted natural gas stream to provide a C5 to C8-depleted natural gas stream, wherein the second adsorbent has higher selectivity and capacity for adsorbing the C5 to C7 hydrocarbons than the first adsorbent;

contacting a third adsorbent that preferentially adsorbs residual water with the C8-depleted natural gas stream; and liquifying the C5 to C8-depleted natural gas stream in a liquifying stage.

9. The process of claim 8, wherein the step of contacting the third adsorbent with the C8-depleted natural gas stream is further defined as contacting a zeolite molecular sieve adsorbent with the C8-depleted natural gas stream.

10. The process of claim 8, wherein the steps of contacting the first adsorbent, contacting the second adsorbent, and contacting the third adsorbent comprise contacting the first adsorbent provided in an amount of from about 10 to about 70 percent by volume with the natural gas feed, contacting the second adsorbent provided in an amount of from about 20 to about 90 percent by volume with the C8-depleted natural gas stream, and contacting the third adsorbent provided in an amount of from about 5 to about 20 percent by volume with the C8-depleted natural gas stream, with all amounts based upon a combined volume of the first adsorbent, the second adsorbent, and the third adsorbent.

11. The process of claim 8, further comprising the step of contacting the natural gas feed with an aqueous amine solution.

12. The process of claim 11, wherein the natural gas feed is contacted with the aqueous amine solution prior to contacting the first adsorbent with the natural gas feed.

13. The process of claim 12, wherein the third adsorbent is contacted with the C8-depleted natural gas stream after contacting the first adsorbent with the natural gas feed and prior to contacting the second adsorbent with the C8-depleted natural gas stream.

14. The process of claim 8, wherein the step of contacting the first adsorbent with the natural gas feed is further defined as contacting the first adsorbent comprising silica gel or aluminosilicate gel having an average pore size of at least 10 Angstroms with the natural gas feed.

15. The process of claim 8, wherein contacting the second adsorbent with the C8-depleted natural gas stream is further defined as contacting the second adsorbent comprising a zeolite molecular sieve adsorbent having an average pore size of from about 5 to about 15 Angstroms with the C8-depleted natural gas stream.

16. The process of claim 8, wherein contacting the second adsorbent with the C8-depleted natural gas stream is further defined as contacting the second adsorbent comprising an activated carbon adsorbent with the C8-depleted natural gas stream.

17. The process of claim 8, wherein the steps of contacting the first adsorbent and contacting the second adsorbent comprise contacting the first adsorbent provided in an amount of from about 10 to about 90 percent by volume with the natural gas feed, and contacting the second adsorbent provided in an amount of from about 10 to about 90 percent by volume with the C8-depleted natural gas stream, with all amounts based upon a combined volume of the first adsorbent and the second adsorbent.

18. The process of claim 17, wherein the step of contacting the first adsorbent with the natural gas feed provides the C8-depleted natural gas stream having the C8 or greater hydrocarbons depleted to a concentration of less than or equal to about 2 parts per million by volume in the C8-depleted natural gas stream, and wherein the step of contacting the second adsorbent with the C8-depleted natural gas stream provides the C5 to C8-depleted natural gas stream having the C5 to C7 hydrocarbons depleted to a concentration of less than or equal to about 2 parts per million by volume in the C5 to C8-depleted natural gas stream.

19. The process of claim 8, wherein a multi-bed adsorption unit comprises a first adsorbent bed comprising the first adsorbent and a second adsorbent bed comprising the second adsorbent, and wherein the step of contacting the first adsorbent with the natural gas feed is further defined as introducing the natural gas feed into the first adsorbent bed of the multi-bed adsorption unit to provide the C8-depleted natural gas stream.

* * * * *